Inventor
Louis H. L. Bellem
by Wilkinson & Mawhinney
Attorneys.

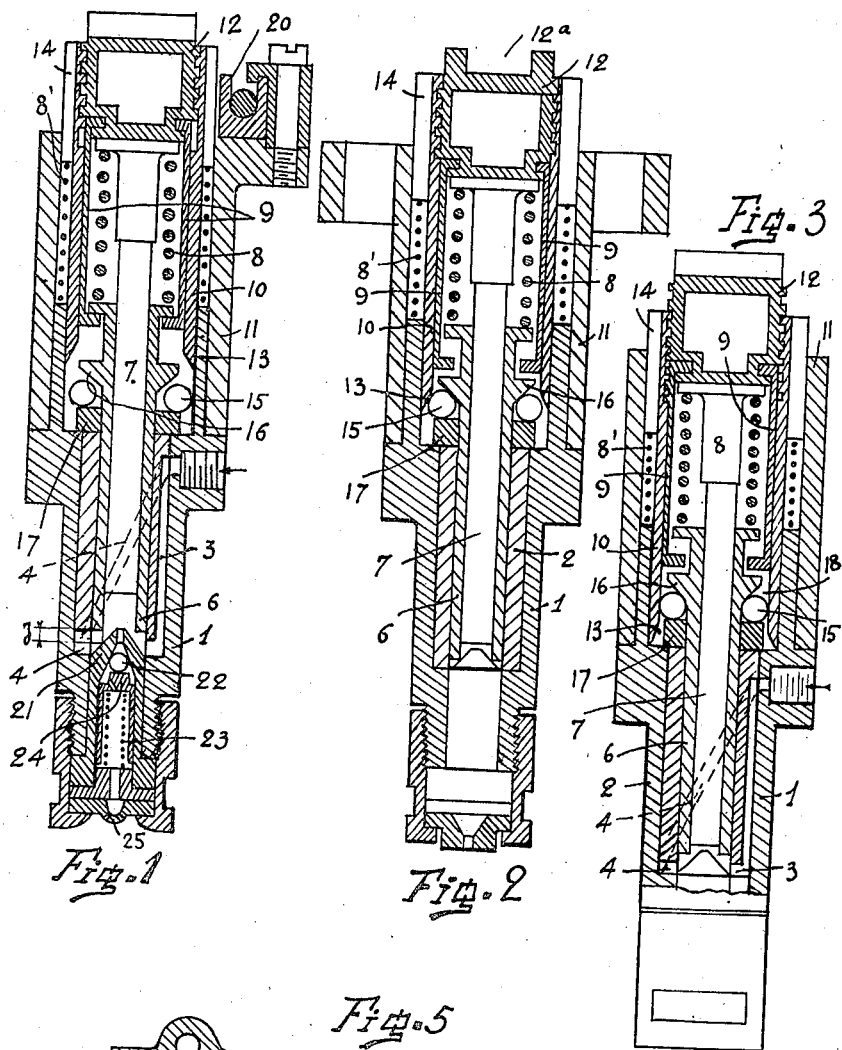

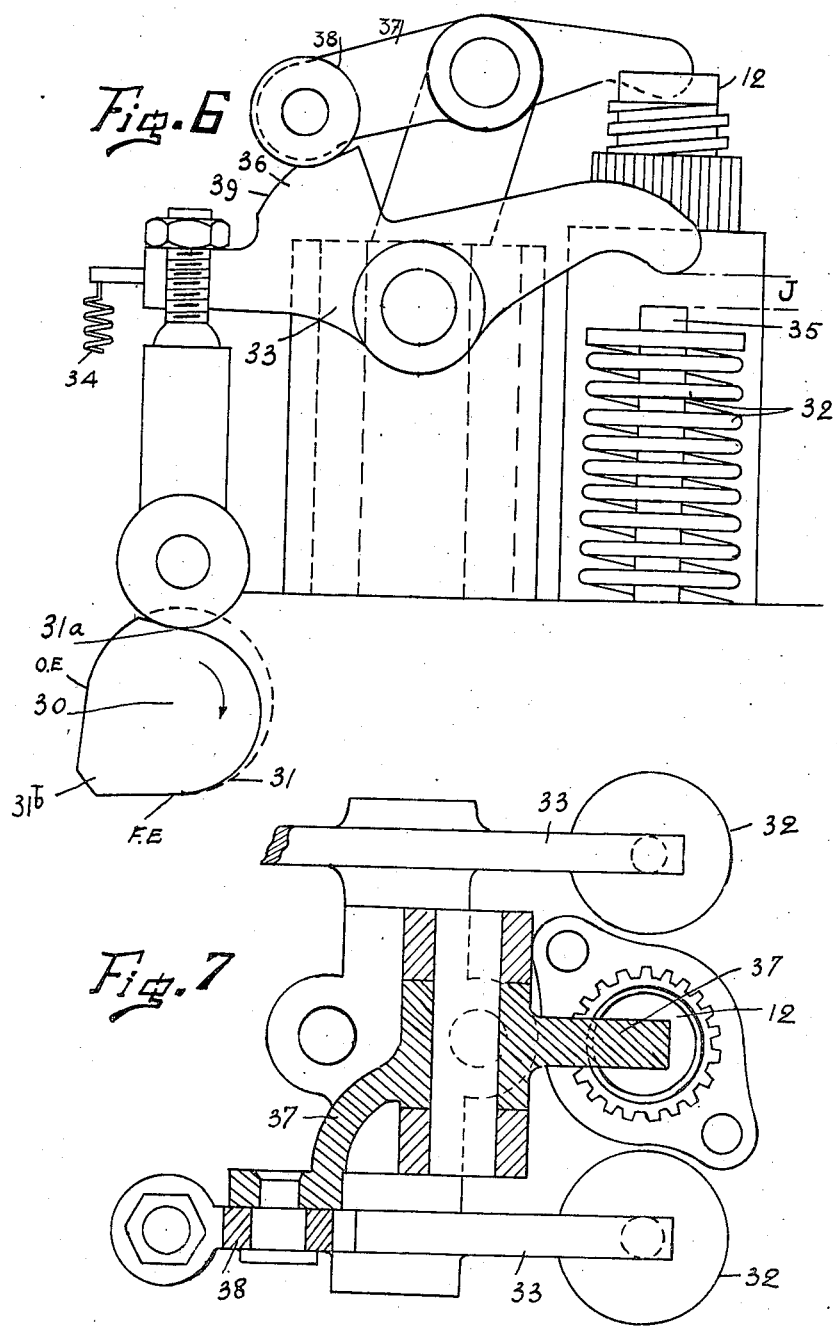

Patented July 19, 1938

2,124,133

UNITED STATES PATENT OFFICE 2,124,133

INJECTION DEVICE FOR INTERNAL COMBUSTION ENGINES

Louis Henri Libert Bellem, Asnieres, France

Application September 14, 1936, Serial No. 100,797
In Belgium January 7, 1936

8 Claims. (Cl. 299—107.2)

The present invention relates to improvements in injection devices for internal combustion engines.

In devices of this kind, the fuel is generally supplied by a piston which is operated by a cam. The speed of said piston and consequently the injection speed, i. e. the speed at which the fuel is projected into the engine, is small at the beginning and at the end of an injection stroke, which results in a poor atomization.

In order to obviate such drawback, means have already been proposed whereby the injection only starts after the beginning of the injection stroke and stops before the end of same, so that the whole of the injection is effected at full speed, therefore giving a good atomization. In particular, it has been proposed to make the pump cylinder movable, so that its open end is only connected to the aperture of the injection passage during a given and adjustable portion of the piston stroke. At the end of the injection said cylinder must therefore be moved away from said aperture, while the piston still continues to move towards same, which fact sets a problem of mechanics.

The formerly proposed arrangement was devised for fuel pumps mounted outside the engine, and one object of this invention is to use an arrangement of such kind in pumping injectors, that is, in injectors having their own means for forcing the fuel into the cylinders on which said injectors are directly mounted.

Another object of the invention is to provide a novel and very compact arrangement. In this arrangement, the pump piston carries a primary wedge which co-operates with a movable member, at a point of its downward stroke, to impart to same a transversal movement, and said member co-operates as a secondary wedge with the pump cylinder to impart to same, when being so moved, a small upward movement which lifts same from said injection passage aperture. In other words, the lowering of said piston causes, by means of a double wedge device, a lifting of said cylinder. The downward stroke denotes here the delivery stroke towards the injection passage aperture. The connection of said primary wedge to the piston can be adjustable in order to allow the instant when the cylinder is lifted and when the injection ends to be adjusted.

According to an embodiment of the invention, said primary wedge is formed of a sleeve carried on the piston and the lower edge of which is bevelled to form a wedge, and the secondary wedge is formed of radially guided balls co-operating with a tapered flange on the cylinder. In order to reduce the friction of the balls, one ball or a pair of balls can be inserted between each wedge forming ball and the guideway of same. Said sleeve can be lightly screwed on the piston and be provided with spur gear teeth enabling it to be turned during operation for adjusting the end of the injection. In case of a multi-cylinder engine, the sleeves of the pumping injectors of all the cylinders can be controlled together, as by a rack engaging said teeth.

A further object of the invention is to provide a simple control for pumping injectors mounted on an engine. In this control, the cam for the injector rocker is formed on the exhaust valve rocker, which is in turn controlled by an exhaust cam carried on one of the conventional cam shafts of the engine, and the contours of said cams are such that at the injection time (which means the instant when the injection is to be effected), the exhaust cam moves the exhaust valve rocker in order that the latter may move the injection rocker and cause an injection and that it may come near the exhaust valve without opening said valve, while at the subsequent exhaustion time, it further moves said exhaust cam rocker, so that the same opens said valve without further moving said injection rocker.

Other features of the invention relate to the injection nozzle structure with the adjacent passage. In order to avoid the reflux of the fuel, a check valve (ball) is usually arranged in that passage. This ball is supported on a spring-returned plunger which is more or less depressed by the fuel pressure to let the fuel pass and which is then returned upwardly by its spring to seat the ball. Usually, such plunger is hollow, provided with holes at the top and opening by its open lower end into the nozzle, said spring being accommodated within said plunger. According to the invention, said plunger can be solid and be engaged in the nozzle, spiral grooves being provided for the fuel and the spring being arranged around said plunger.

Moreover, the end of said plunger can be extended by a tapered projection engaged in the nozzle opening, so as to leave, between itself and the edge of said opening, an annular gap which will be all the wider as the said plunger is further depressed. An injection cross-section is thus obtained, which is proportioned to the injected quantity, since the plunger is all the more depressed as the fuel is delivered in greater quantity. Therefore, the injection speed only slightly varies with the output, whereby by suitably proportioning the injector, the latter is enabled to give the best atomization at any speed of the engine.

Other features and pecularities of the invention will appear from the following description with reference to the accompanying drawings, in which:

Fig. 1 is a longitudinal section of a pumping injector according to the invention;

Fig. 2 shows the same in a longitudinal section taken at right angles to Fig. 1 and in a different position;

Fig. 3 is a view similar to Fig. 1 but in still another position;

Fig. 4 is a plan view of the lower body of said injector;

Fig. 5 is a plan view of the whole injector;

Fig. 6 is an elevation of a control device for said injector;

Fig. 7 shows the same in plan view, partly in section;

Figure 8:
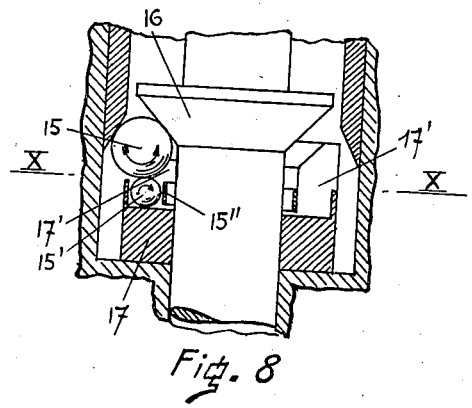
Fig. 8 is a partial longitudinal section of a detail modification.

1 is the body of a pumping injector which can be mounted in the place of a known injector. Said body is lined with a guide sleeve 2 forming an inlet chamber and having two diametrically opposed grooves 3 and 4 (Figs. 1 and 4) for the inlet and the outlet of the fuel which a feed pump of any type continually circulates. The fuel arrives through A, passes through the groove 3 and flows out through the spiral groove 4 to finally reach the outlet S. In a multi-cylinder engine, the inlets and the outlets of all the injectors are in parallel on the same inlet or outlet manifold, respectively.

In the guide 2 slides a movable cylinder 6 in which works a piston 7; between said cylinder and piston is interposed a spring 8 which is held in compression in a box 9 (formed of two members). Said box 9 is placed in a sleeve 10 adapted to slide in a hollow member 11 secured on the body 1. A push member 12 is secured to the box 9 by a circular groove in which the two half members of said box are fitted. Said push member is to be operated by a rocker, a cam or any other operating member. It has a groove 12ª in which fits the rocker (or other operating member) (not shown), which consequently prevents the push member from rotating. The sleeve 10 is screwed on said push member by means of a long pitched thread.

The lower edge 13 of the sleeve 10 is bevelled and is adapted to act as a wedge on balls 15 which themselves act as a wedge on a tapered flange 16 on the cylinder 6. At its upper part, said sleeve has a toothing 14 which enables it to be rotated by a rack 20 to vary the height between the bearing point of the rocker arm and the edge 13.

The bottom of the inlet chamber is formed of the conically shaped top 21 of a nozzle structure, which top provides an injection passage the aperture of which is at the top of the cone. The cylinder 6 can seat on said cone by its open lower end and is then connected to the injection passage.

Fig. 1 shows the pumping injector in the inoperative position and adjusted for its maximum output, i. e. with the edge 13 at its greatest distance from the balls 15. In this position, whatever be the output required, owing to a spring 8', there is no play between the rocker arm and the push member 12, nor between the roller and the cam of the rocker (not shown). At this moment, there is play J of about 1 mm. between the cylinder 6 and the cone 21.

Under the action of a rocker, a cam or of any other control member, on the push member 12, the whole structure connected to the latter moves downwards, but after a stroke J, the cylinder 6 stops on the cone 21 on which it is pressed by the spring 8, which is always compressed to about 10 kgs. The joint between the cylinder 6 and the cone 21 is quite tight. The injection begins at this instant. The beginning of the injection is thus invariable, which enhances operation when idling.

The stroke continues, the spring 8 being further compressed (see Fig. 2). When the bevel 13 engages the balls 15, the latter, by moving radially on a washer 17, lift the cylinder 6 from its seat 21 (see Fig. 3). The injection stops then at once, this being a necessary condition for a satisfactory atomization.

The distance which remains between the edge 13 and the balls 15 when the cylinder 6 touches the cone 21 determines the output. Said output can therefore be adjusted by screwing or unscrewing the sleeve 10 on the push member 12. This control is effected by means of the rack 20 which simultaneously acts on all the injectors, in the case of a multi-cylinder engine. The governor, either centrifugal or operated by suction, operates this control. The output will be nil if the bevel 13 engages the balls 15 at the moment when the cylinder 6 should engage the cone 21. In this case, the cylinder 6 is lifted right from the beginning of the delivery by the piston 7; the bevel 13 and the cylindrical portion 18 of the sleeve 10 maintain the leak between said cylinder and cone, and the piston delivers into the feed circuit.

When the roller of the rocker rolls down the cam, the springs 8 and 8' co-operate to bring back the movable structure of the injector to the inoperative position. When the spring 8 has completely expanded within the limits of the box 9, pressing the cylinder 6 and the piston 7 against the ends of said box, the spring 8' continues to lift said structure to re-establish the play J. The filling of the pump is then completed, and another injection can take place.

A check valve is provided in the injection passage, being formed of a ball 22. Said ball is supported on a hollow plunger 24, which is urged upwards by a spring 23, placed in the plunger, to press said ball against its seat in the cone 21. As soon as the cylinder 6 leaves the cone 21, said plunger, which is open at the bottom and which has at the top a hole substantially smaller than the top aperture of said cone, acts as a piston and rises to prevent any leakage at the injection holes in the nozzle 25.

A control mechanism for the push members 12 of the pumping injectors is shown in Figs. 6 and 7. Such mechanism can be readily mounted on an existing engine in order to transform same into an engine with pumping injectors. It allows, the control of the pump injectors through one of the cam shafts which already exist on the engine, viz. through the exhaust cam shaft. It can be used for controlling pumping injectors of any type.

In the example shown, the exhaust shaft 30 is used. At 31 is shown the cam which operates the exhaust valve, not shown but the spring 32 whereof is shown in Fig. 6. The cam 31 operates a rocker 33, which is retracted by a spring 34 and acts on the stem 35 of said exhaust valve.

Said cam 31 usually has the contour shown in dotted lines in Fig. 6. With the contour according to the invention, shown in full lines, the extreme inoperative position of the rocker 33, to which it is urged by the spring 34, is brought further back, so that said rocker is lifted a distance J above the stem 35 of the exhaust valve. The connection between the new contour of the cam 31 and the former one forms a rise 31$^a$ which brings again said rocker into contact with said stem, while the usual projection or boss 31$^b$, which begins at O.E., further moves said rocker, so that it opens said valve.

Provided on the exhaust rocker itself is a cam 36 intended to control a rocker 37 which operates the push member 12 of the pumping injector and which has a follower roller 38. It has been stated that the passage of the first rise 32$^a$ results in a first movement of the exhaust rocker, during which the exhaust valve is not operated. Now, the cam 36 is such that this first movement of the exhaust rocker operates the injection rocker to cause an injection. Obviously, the rise 31$^a$ is located on the cam 31 so that the injection will be caused at the desired instant, i. e. the injection time. The cam 36 continues in a concentric portion 39 which no longer moves the injection rocker as the boss 31$^b$ further moves the exhaust rocker to open the exhaust valve. The suction stroke of the push member 12 takes place as the exhaust rocker, after having closed the exhaust valve, is lifted from the stem 35, which fact occurs during the passage of the first portion of the new contour of the cam 31, approximately between the point F.E. and the rise 31$^a$.

It will be noted that the new contour of the cam 31 is situated inside the former one, so that an existing cam can be transformed by milling or other tooling operation into a cam according to the present invention. As is more particularly seen in Fig. 7, the cylinder head of the engine requires no modification.

In view of this control, the inlet cam shaft also could be used, instead of the exhaust cam shaft.

Figure 9:
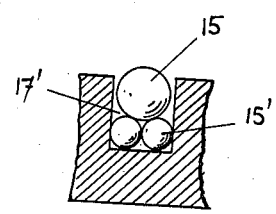
Fig. 9 is a partial tangential section on the line IX—IX in Fig. 10.
Figure 10:
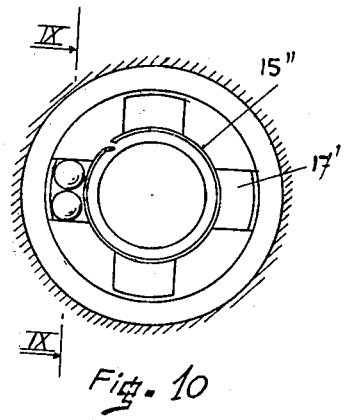
Fig. 10 is a cross section on the line X—X in Fig. 8.

The wedge forming balls 15 of the device shown in Figs. 1 to 5 cannot simply roll at the same time on the bevel 13, the tapered flange 16 and the washer 17: a certain amount of sliding must take place, either at least on the washer 17, or distributed on two of said surfaces or on the three. The device shown in Figs. 8–10 allows this total amount of sliding to be reduced. In this device, a pair of balls 15' is inserted between each ball 15 and said washer 17, which is here relatively thick and is provided with suitable slots 17' to accommodate said balls. An annular spring 15'' presses the balls 15' outwards. This device allows each ball 15 to rotate on itself in the opposite direction when rolling on the bevel 13, the tapered flange 16 and the balls 15'.

Figure 11:
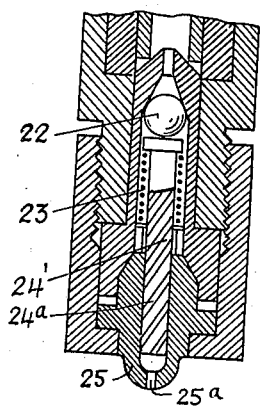
Fig. 11 is a partial longitudinal section of a structural modification of the injection nozzle.

In the modification shown in Fig. 11, the small hollow plunger 24 shown in Fig. 1 is replaced by a longer, solid plunger 24', engaging the nozzle 25 and provided with spiral grooves 24$^a$ through which the fuel passes into the injection opening 25$^a$. A better atomization of the fuel is thus obtained.

Figure 12:
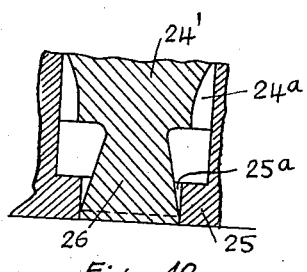
Figs. 12 and 13 are partial longitudinal sections of another structural modification of the injection nozzle, in two different positions.
Figure 13:
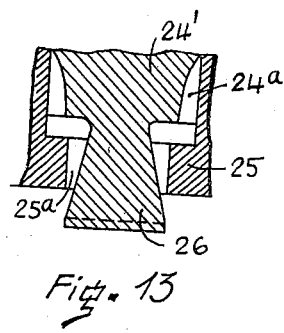

Instead of ending the plunger 24' within the nozzle, before the injection opening 25$^a$, it may be extended, according to the modification shown in Figs. 12 and 13, by a tapered projection 26 engaging said injection opening. The object of such arrangement is as follows: owing to the arrangement of Figs. 1–5, the injection occurs during the movement at full speed of the push member 12, yet this speed is proportional to that of the engine; during each injection, the fuel output rate is therefore proportional to the engine speed; and the injection speed, which is equal to the quotient of said output rate by the section of the injection opening, varies in the same proportion with an opening having a fixed section and gives a poor atomization at low engine speeds. Now, owing to the projection 26, the plunger 24', which is depressed, at each injection, all the more as the output rate of same is increased, controls the annular section of the injection opening in conformity with said output rate. Thus, a substantially constant injection speed, and therefore a uniformly good atomization, can be obtained at any engine speed. In Fig. 12, the plunger 24' is in its upper position, and the larger end of the projection 26 engages the opening 25$^a$ and entirely closes the same; while in Fig. 13, said projection is nearly in its most depressed position.

It is obvious that the invention has only been described and illustrated herein in an explanatory and not limitative manner and that modifications can be made within the scope of the appended claims.

I claim:

1. Fuel injector for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, and means in said hollow member for lifting said cylinder from said aperture at the end of said stroke section, whereby injection of fuel into the engine is caused to occur only during said stroke section.

2. Fuel pump for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, a primary wedge connected to said piston for reciprocation therewith, and a transversally movable member in said hollow member, adapted to be moved by said primary wedge at the end of said stroke section and when so moved, to lift said cylinder from said aperture, whereby injection of fuel into the engine is caused to occur only during said stroke section.

3. Fuel pump for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, a primary wedge adjustably connected to said piston for reciprocation therewith, a transversally movable member in said hollow member, adapted to be moved by said primary wedge at the end of said stroke section and when so moved, to lift said cylinder from said aperture, and means for adjusting the position of said wedge relatively to said piston to adjust said stroke section end, whereby injection of fuel into the engine is caused to occur only during said adjustable stroke section.

4. Fuel pump for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, a sleeve on said piston, arranged around said cylinder and having an inner bevel on its lower end, radially movable balls in said hollow member and adapted to be operated by said bevel at the end of said stroke section, and a downwardly tapered flange on said cylinder and so co-operating with said balls that said cylinder is lifted from said aperture as said balls are moved by said sleeve end bevel, whereby injection of fuel into the engine is caused to occur only during said stroke section.

5. Fuel pump for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, a sleeve on said piston, arranged around said cylinder and having an inner bevel on its lower end, radially movable balls in said hollow member and adapted to be operated by said bevel at the end of said stroke section, radial guideways for said balls, other balls between said guideways and the first said balls and a downwardly tapered flange on said cylinder and so co-operating with the first said balls that said cylinder is lifted from said aperture as said balls are moved by said sleeve end bevel, whereby injection of fuel into the engine is caused to occur only during said stroke section.

6. Fuel pump for internal combustion engines, comprising a hollow member forming an inlet chamber with a substantially vertical cylindrical portion, and providing an injection passage having an aperture in said chamber, below said cylindrical portion of same, check valve means in said passage, a nozzle structure directly connected to said passage and opening into the engine, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, a sleeve movably screwed on said piston, arranged around said cylinder and having spur gear teeth on its upper end and an inner bevel on its lower end, a toothed control member adapted to engage said sleeve end teeth throughout the reciprocations of said sleeve and to be moved for adjusting said sleeve on said piston, radially movable balls in said hollow member and adapted to be operated by said sleeve end bevel at the end of said piston stroke section, and a downwardly tapered flange on said cylinder and so co-operating with said balls that said cylinder is lifted from said aperture as said balls are moved by said sleeve end bevel, whereby injection of fuel into the engine is caused to occur only during said stroke section.

7. Fuel injector for internal combustion engines, comprising a hollow member forming an inlet chamber with a substantially vertical cylindrical portion, and providing an injection passage having an aperture in said chamber, a nozzle structure directly connected to said passage and opening into the engine, said structure including a nozzle proper, a check valve in said passage, a solid plunger behind said check valve, engaged in said nozzle and adapted to be depressed through same by the fuel input, and a spring arranged around said plunger and urging same to close said valve, said plunger having spiral grooves to let the fuel from said passage into said nozzle, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, and means in said hollow member for lifting said cylinder from said aperture at the end of said stroke section.

8. Fuel injector for internal combustion engines, comprising a hollow member forming an inlet chamber with a substantially vertical cylindrical portion, and providing an injection passage having an aperture in said chamber, a nozzle structure directly connected to said passage and having an injection opening which opens into the engine, said structure including a nozzle proper, a check valve in said passage, a solid plunger behind said check valve, engaged in said nozzle and adapted to be variably depressed through same by the variable fluid input, and a spring urging said plunger to close said valve, said plunger having at its lower end a depending, upwardly tapered extension protruding through said nozzle opening, whereby an automatically varying annular injection gap is provided in said opening around said extension, a fuel pump cylinder slidably mounted in said vertical cylindrical portion of said chamber and having an open lower end, a piston adapted to work in said cylinder, means in said hollow member for depressing said cylinder to tightly connect its open end to said passage aperture during a section of the injection stroke of said piston, and means in said hollow member for lifting said cylinder from said aperture at the end of said stroke section.

LOUIS HENRI LIBERT BELLEM.